(12) United States Patent
Chwirka

(10) Patent No.: US 6,787,041 B2
(45) Date of Patent: Sep. 7, 2004

(54) CARBON DIOXIDE ENHANCED COMPLEX-ADSORPTION PROCESS FOR METAL OR METALLOID REMOVAL FROM WATER

(75) Inventor: Joseph Daniel Chwirka, Tijeras, NM (US)

(73) Assignee: CH2M Hill, Inc., FL (US)

(*) Notice: Subject to any disclaimer, the term of this patent is extended or adjusted under 35 U.S.C. 154(b) by 159 days.

(21) Appl. No.: 10/186,300

(22) Filed: Jun. 28, 2002

(65) Prior Publication Data

US 2003/0010720 A1 Jan. 16, 2003

Related U.S. Application Data (60) Provisional application No. 60/301,729, filed on Jun. 28, 2001.

(51) Int. Cl.⁷ .................................................. C02F 1/28
(52) U.S. Cl. ........................ 210/668; 210/669; 210/688
(58) Field of Search .............................. 210/660, 668, 210/669, 688

(56) References Cited

U.S. PATENT DOCUMENTS

| | | |
|---|---|---|
| 3,027,321 A | 3/1962 | Selm et al. |
| 4,565,633 A | 1/1986 | Mayenkar |
| 4,950,409 A | 8/1990 | Stanforth |
| 5,024,769 A | 6/1991 | Gallup |
| 5,098,579 A | 3/1992 | Leigh et al. |
| 5,266,203 A * | 11/1993 | Mukhopadhyay et al. .. 210/638 |
| 5,358,643 A | 10/1994 | McClintock |
| 5,547,588 A | 8/1996 | Hassett et al. |
| 5,609,766 A | 3/1997 | Schneider et al. |
| 6,214,233 B1 * | 4/2001 | Lewis, III ................... 210/662 |
| 2002/0003116 A1 | 1/2002 | Golden |

FOREIGN PATENT DOCUMENTS

| | | |
|---|---|---|
| CA | 1067627 | 12/1979 |
| DE | 1517689 | 9/1969 |
| DE | 43 20 003 A1 | 12/1994 |
| JP | 50-79169 | 6/1975 |
| JP | 53-142042 | 12/1978 |
| JP | 54-120940 | 9/1979 |
| JP | 59-199097 | 11/1984 |

OTHER PUBLICATIONS

Chen, et al., Predicting Arsenic Removal by Ferric Hydroxides in the Presence of Silica, Sulfate, and NOM, AWWA Conference, Jun. 19, 2001.

Chwirka, et al., Journal of the American Water Works Association, Mar. 2000; 92:79–88.

* cited by examiner

*Primary Examiner*—Robert A. Hopkins
(74) *Attorney, Agent, or Firm*—Swanson & Bratschun LLC (57) ABSTRACT

A method of removing metal or metalloids, arsenic in particular, from groundwater or another source of contaminated water. The method comprises providing a water source, contacting the water source with $CO_2$, whereby the pH of the water source is lowered to produce pretreated water, contacting the pretreated water with a metal or metalloid complex-adsorbing substance whereby contaminants are separated from the remainder of the pretreated water to produce metal or metalloid-depleted water, and stripping the $CO_2$ from the metal or metalloid-depleted water, whereby the pH of metal or metalloid-depleted water is increased. A system for metal removal utilizing the $CO_2$ process is also provided.

34 Claims, 6 Drawing Sheets

CARBON DIOXIDE ENHANCED COMPLEX-ADSORPTION PROCESS FOR METAL OR METALLOID REMOVAL FROM WATER

RELATED APPLICATIONS

This application claims priority from U.S. Provisional Patent Application Serial No. 60/301,729, filed Jun. 28, 2001, entitled "Carbon Dioxide Enhanced Adsorption Process for Heavy Metal Removal with Aeration for CO2 Stripping."

FIELD OF THE INVENTION

This invention is concerned with the removal of metals or metalloids, arsenic in particular, from groundwater, surface water, or other contaminated waters. More specifically, this invention is concerned with arsenic removal via complex-adsorption media from a water pre-treated with carbon dioxide to lower the pH of the water.

BACKGROUND OF THE INVENTION

Water can be supplied to a treatment system from groundwater sources, surface water sources or from various types of wastewater supply. Often, the water supplied for treatment is contaminated with metals or metalloids to a greater or lesser degree. Representative metals are: copper, antimony, selenium, mercury, cadmium, lead and chromium. Arsenic (arsenate) and phosphorous (phosphate) are representative metalloids.

Arsenic is a naturally occurring metalloid found in many groundwater supply systems. Additionally, arsenic is found in wastewater or other contaminated water from numerous sources. Arsenic has been associated with several forms of cancer and other non-cancer illnesses when ingested. The EPA has promulgated a new arsenic Maximum Contaminant Level (MCL) of 10 $\mu$g/L in drinking water. It is estimated that at an arsenic MCL of 10 $\mu$g/L approximately 5% of the water systems in the U.S. will be out of compliance (Frey, 1999). The majority of those systems are groundwater systems located in the southwestern U.S.

It has been estimated that the national cost of compliance at an arsenic MCL of 10 $\mu$g/L is in the range of $2.5 to 4 Billion. In the state of New Mexico alone, the capital cost for arsenic treatment at an MCL of 10 $\mu$g/L may exceed $400 Million.

Two known complex-adsorption methods of removing arsenic from groundwater are by adsorption on to a fixed media or adsorption on a coagulant followed by filtration or microfiltration. The fixed media may be one of many including granular ferric hydroxide, activated alumina, iron modified activated alumina, iron modified zeolite, and other proprietary media. Coagulants may include ferric chloride, aluminum sulfate, copper sulfate, or ferric sulfate. The adsorption of arsenic on a media or a coagulant relies on surface complexation to remove arsenic from water, that is, the media or the coagulant has a net positive charge which allows complexation with negatively charged arsenate molecules. The degree of positive charge on the media or coagulant is a function of feed water pH. As the pH is lowered, the adsorption media or coagulant will have a greater positive charge and a greater affinity for the negatively charged arsenate molecules. This complex-adsorption process will apply to other metalloids and metals as well.

With many fixed adsorptive media, the life (or "run length") is very short at raw water pH values greater than 8.0. As such, the economic viability of adsorption media is very poor at pH values greater than 8.0. If the pH of the feed water can be reduced, adsorption media will last longer and will be more economical. Adding a mineral acid such as sulfuric acid or hydrochloric acid can reduce the pH, however these strong acids are dangerous and hazardous to store and handle. In addition, the low pH water will be corrosive to the distribution system and will require the further addition of a strong base such as caustic soda to increase the pH. Therefore, one may consider the use of mineral acids and strong bases when implementing an adsorption media and the raw water pH is greater than 8.0, but with additional cost and safety concerns. In addition, groundwaters that have a high silica concentration may cause adsorption media and microfilter membranes to foul at higher pH values (Chen, et al., Predicting Arsenic Removal by Ferric Hydroxides in the Presence of Silica, Sulfate, and NOM, AWWA Conference, Jun. 19, 2001). Furthermore, coagulants such as ferric chloride exhibit better adsorption performance at lower pH values (Chwirka, et al, Journal of the American Water Works Association, March, 2000).

Several processes have been patented or have applications pending concerning the treatment of water supplies contaminated with arsenic. These prior art processes recognize the necessity of adjusting the pH of an arsenic containing solution or oxidizing the arsenic to achieve desired removal strategies. For example, Gallup, U.S. Pat. No. 5,024,769, which is primarily concerned with the treatment of geothermal brine which has a relatively high proportion of arsenite wherein the arsenic is in the +3 valance state, teaches contacting of the arsenic containing solution with an oxidizing agent, specifically an oxidizing biocide. This process oxidizes a substantial portion of the arsenite compounds to arsenates. The oxidation of the arsenic compounds to arsenate aids in its subsequent reaction to form an insoluble precipitate.

McLintock, U.S. Pat. No. 5,358,643 discloses the treatment of water containing arsenic with an acid and an oxidant to facilitate arsenic removal. Sulfuric acid is specifically mentioned as the preferable acid for the McLintock process. McLintock also teaches the use of strong base such as sodium hydroxide to raise pH and facilitate precipitation after arsenic complexion. Similarly, Golden, published U.S. application U.S. 2002/0003116 A1 discloses the use of an acid to depress pH followed by treatment with hydrogen peroxide (an oxidizing agent) to enhance arsenic removal from water. Although Golden does not specify a preferred acid, the acidification step requires a pH of 3–5 which will only be achieved by the addition of a relatively concentrated and strong acidifying agent.

Each of the methods known in the prior art which compensate for the pH dependence of arsenic removal by complex-adsorbing means rely on relatively dangerous and hazardous chemicals to accomplish the needed pH and oxidation state adjustments.

The present invention is intended to overcome one or more of the problems discussed above.

SUMMARY OF THE INVENTION

A first aspect of the present invention is a method of removing a metal or metalloid from water which includes providing water containing a metal or metalloid from a source. The water is contacted with carbon dioxide to lower the pH of the water resulting in a pre-treated water. The pre-treated water is then contacted with a metal or metalloid complex-adsorbing substance to produce a metal or metalloid depleted water. Carbon dioxide is then removed or stripped from the depleted water to increase the pH of the depleted water. The carbon dioxide is preferably stripped from the depleted water by some form of aeration. The metal or metalloid may be selected from the group consisting of arsenic, copper, antimony, selenium, mercury, cadmium, chromium and lead. The pH is preferably lowered to about 7 or less to produce the pre-treated water.

In one embodiment the metal or metalloid complex-adsorbing substance is an adsorption media. In another embodiment the metal or metalloid complex-adsorbing substance is a coagulant and following contacting treatment, the depleted water is filtered to separate the coagulant and bound metal or metalloid from the depleted water.

Another aspect of the present invention is a method of removing arsenic from water which includes providing water containing arsenic from a source. The water is contacted with carbon dioxide to lower the pH of the water and produce a pre-treated water. The pre-treated water is contacted with an arsenic complex-adsorbing substance to produce arsenic depleted water. The pH is preferably lowered to about 7 or less to produce the pre-treated water. The arsenic depleted water is preferably subject to stripping of the carbon dioxide to increase the pH of the arsenic depleted water. The stripping may be accomplished by aeration. The complex-adsorbing substance may be an adsorption media or a coagulant. When the complex-adsorbing substance is a coagulant a further step of filtering the depleted water to separate the coagulant and the bound arsenic from the depleted water is added. Filtering can be accomplished, for example, with microfilter, conventional filtration, pressure filtration, AquaDisk filter, or other filtration device. In one embodiment, the pre-treated water is contacted with the arsenic complex-adsorbing substance for a time sufficient to produce an arsenic depleted water having less than 10 µg/liter of arsenic.

Yet another aspect of the present invention is an apparatus for removing arsenic from water containing arsenic. The apparatus includes a water flow from a source of water containing arsenic. A source of carbon dioxide is provided in fluid communication with the water flow to supply carbon dioxide to the water flow to thereby lower the pH of the water producing a pre-treated water flow. A contact chamber containing an arsenic complex-adsorbing substance is provided in fluid communication with the pre-treated water flow to remove arsenic from the pre-treated water flow producing a depleted water. A carbon dioxide stripping apparatus may be provided in fluid communication with the depleted water flow for stripping carbon dioxide from the depleted water. The contact chamber may be an adsorption chamber containing an adsorption media. Alternatively, the contact chamber may be a mixing tank in fluid communication with a coagulant supply system supplying an arsenic complex-adsorbing coagulant to the pre-treated water flow. In this embodiment, a filter is provided downstream of the contact chamber to filter the coagulant and yield a filtered water flow.

The method and apparatus of the present invention allows for the removal of arsenic and other metalloids and metals from a source of water. Use of carbon dioxide to lower the pH of the water prior to the arsenic removal enhances the efficiency of the removal and extends the life of the metal or metalloid complex-adsorbing substance used to remove the arsenic. Subsequent removal of the carbon dioxide by aeration or other means raises the pH of the water so that it will not present a corrosion risk following the treatment process. The use of carbon dioxide to adjust the pH eliminates storing and handling of hazardous strong acids and bases and eliminates the addition of chemicals which can adversely effect the taste or wholesomeness of the treated water. This method does not add total dissolved solids ("TDS") to the water, as the use of strong acids and bases would. The method and apparatus can be used to remove any metal, metalloid or non-metals such as dissolved organic matter where removal by a complex-adsorbing media is pH dependent. Moreover, the method and apparatus are simple and result in overall cost savings.

DETAILED DESCRIPTION OF THE INVENTION

Figure 1:
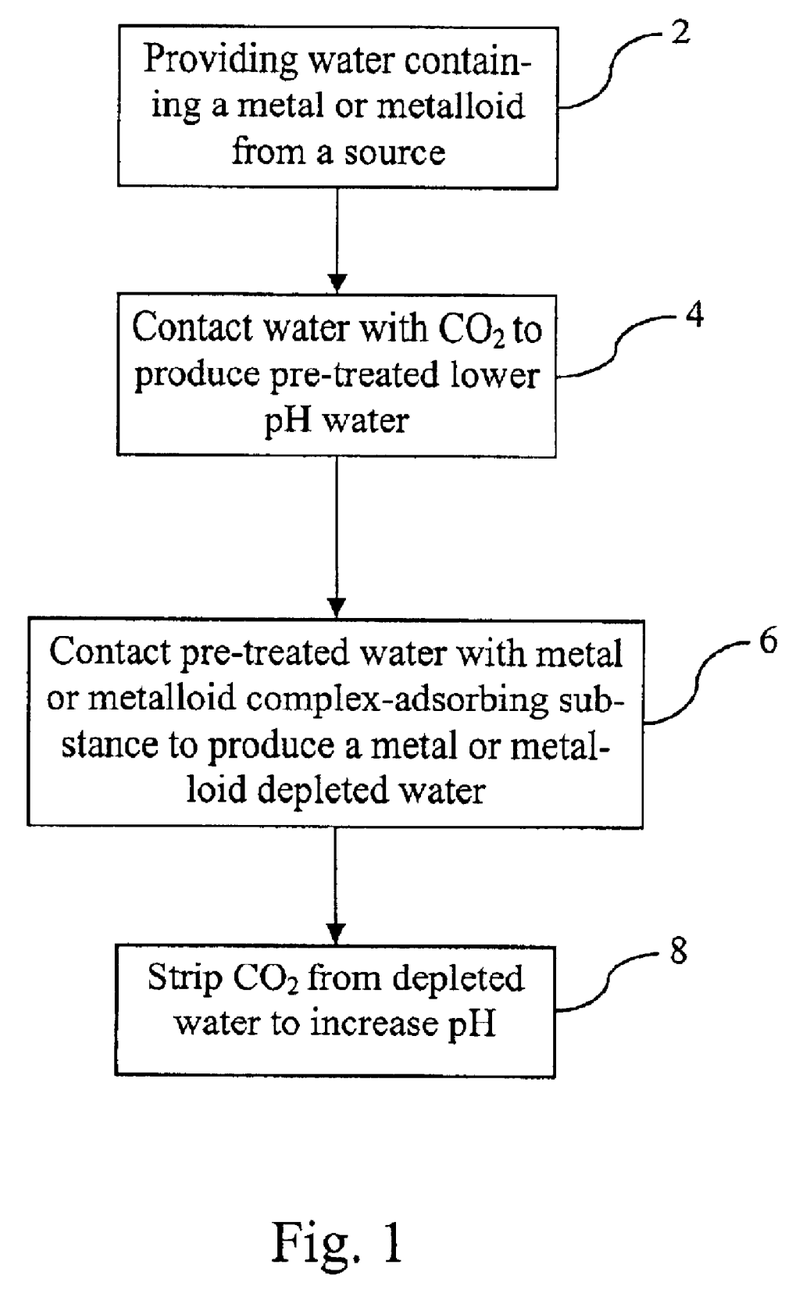
FIG. 1 is a flow chart illustrating a method for removing a metal or metalloid from a water source in accordance with the present invention.

FIG. 1 illustrates in flow chart form the method of the present invention for removal of metal or metalloids from a water source. A first step 2 is providing water containing a metal or metalloid from a source. In a second step 4 water from the source is contacted with $CO_2$ to produce a pre-treated lower pH water. In step 6 the pre-treated water is contacted with a metal or metalloid complex-adsorbing substance to produce a metal or metalloid depleted water. The contact time is a function of the desired metal or metalloid content in the depleted water. In step 8 the $CO_2$ is stripped from the depleted water to yield a water having a pH increased from that of the depleted water.

In a preferred embodiment, water from the source is contaminated with arsenic and the source of the water is ground water. Although particular reference is made herein to use of the invention with ground water sources, it is to be understood that the method is also useful with other water sources, such as surface water, contaminated wastewater, and other contaminated waters. Those of skill in the art will also recognize that the system is useful for remediation of contaminated water such as contaminated ground or surface water, landfill leachate, or other contaminated waters. While a particular application is for the removal of arsenic, metals or metalloids which could be removed using the process include, but are not limited to, copper, antimony, selenium, mercury, cadmium, lead and chromium. Moreover, while this disclosure focuses on use of the invention with respect to metals or metalloids, other non-metals such as dissolved organic matter or phosphorous compounds bearing a negative charge which are subject to removal by a complex-adsorption media may be removed, particularly where the efficiency of the complex-adsorption can be improved by lowering the pH.

In one embodiment the metal or metalloid complex-adsorbing substance used in step 6 is an adsorption media. Preferably, the adsorption media is a iron based media such as granular ferric hydroxide media in a column. Adsorption media such as granular ferric hydroxide ("GFH") has an arsenic removal capacity that is a function of raw water pH. One source of GFH is US Filter or another iron based media manufactured by Severn Trent called Sorb 33.

Figure 2:
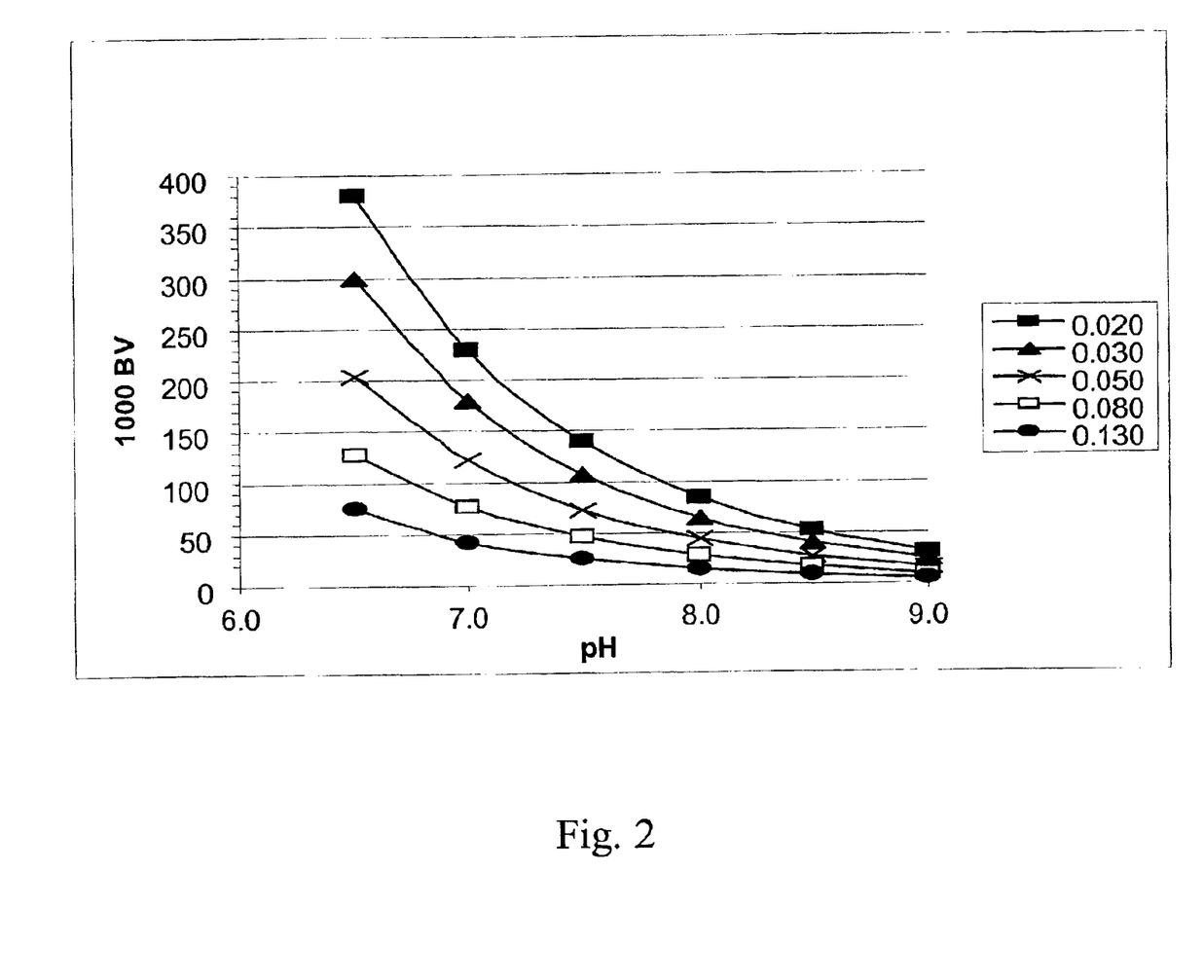
FIG. 2 is a graph showing that the effectiveness granular ferric hydroxide arsenic adsorption media is significantly influenced by the feed water pH, which is true of all known iron and aluminum based arsenic adsorption media.

FIG. 2 illustrates an estimate of run length in terms of bed volumes treated as a function of pH and influent arsenic concentration for GFH adsorption media. (W. Driehaus, 2000, personal communication) The optimum pH for arsenic removal with GFH appears to be about 6.8. This pH optimizes run length of the adsorption media resulting in a minimization the cost of the adsorption media treatment system.

The preferred method utilizing granular ferric hydroxide (GFH) adsorption has been pilot tested using a polyvinyl chloride (PVC) column with the design criteria as presented in Table 1.

TABLE 1

GFH Pilot Design Criteria

| Criteria | Value |
| --- | --- |
| Column Diameter, inches | 8 |
| Media Depth, ft | 4 |
| Media Volume, ft$^3$ | 1.4 |
| Feedwater Flow Rate, gpm | 2.1 |
| Empty Bed Contact Time, min. | 5 |

The influent and effluent arsenic was measured on a weekly basis to determine the performance of the GFH column. Based on an empty bed contact time of 5 minutes and the resulting 1.4 ft$^3$ of media, each bed volume represents a volume of water equal to 10.47 gallons. Stated another way, at an empty bed contact time of 5 minutes, there are around 8,640 bed volumes in a 30-day month.

It was determined in the GFH pilot that a single column would have an arsenic leakage (defined as the amount of residual arsenic measured in the water after treatment) exceeding 10 $\mu$g/L after around 8,000 bed volumes of water were treated. Thus, a single column would last around 27 days of contiuous operation before breaking through at 10 $\mu$g/L arsenic.

The life of the GFH can be extended by more fully utilitizing the adsorption capacity of the media. This can be accomplished by placing two adsorption vessels in series. The first vessel will be allowed to exceed an arsenic leakage of 10 $\mu$g/L, and the second vessel will remove the excess arsenic to below a target level of 8 $\mu$g/L. The series operation will more than double the life of the media to around 18,000 bed volumes.

In another embodiment, the metal complex-adsorbing substance is a coagulant. The effectiveness of arsenic removal by a coagulant is also a function of pH. As the pH of the feed water is reduced, the dose of coagulant is minimized to achieve the desired level of arsenic removal. A suitable coagulant for the removal of arsenic is ferric hydroxide, which is formed from the reaction of ferric chloride, $FeCl_3$, with water. Operating the coagulant dosing treatment system at a pH of 7.0 can optimize or minimize the use of $FeCl_3$. In a preferred embodiment, a filtration device such as microfiltration or media filtration is utilized to remove the solid material. Such systems are well known to those skilled in the art.

The coagulation/microfiltration (C/MF) process consists of adding ferric chloride under the proper pH conditions, and removing the ferric hydroxide precipitate from the water. The precipitate can be removed by any known separation method, for example, gravity separation or filtering, with filtering being preferred. The ferric chloride coagulant will hydrolyze in water to form a ferric hydroxide particle with a positive charge on the particle surface. The extent of positive charge on the ferric hydroxide is a function of water pH. The extent to which arsenic will adsorb to the ferric hydroxide is therefore a function of the pH. Presented in FIG. 3 is a graph showing the ferric chloride dose required to meet various levels of residual arsenic as a function of solution pH.

Figure 3:
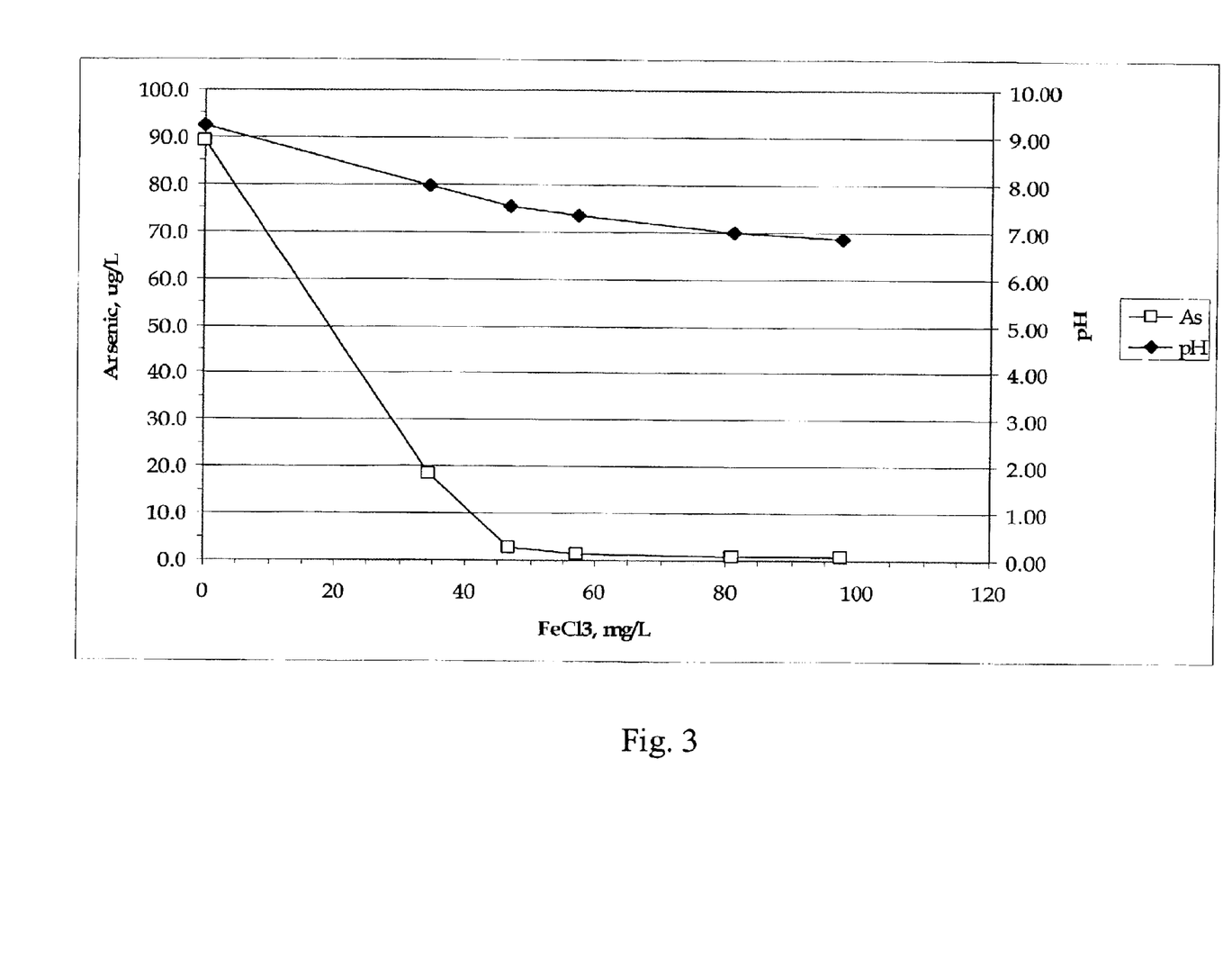
FIG. 3 is a graph showing the effect of ferric chloride dosage on residual arsenic as a function of pH when the coagulation/filtration method of arsenic removal is used without pH adjustment.

FIG. 3 shows that a ferric chloride dose of around 40 to 45 mg/L is needed for non-pH adjusted raw water to reduce the arsenic levels below 10 $\mu$g/L, given an initial arsenic concentration of 90 $\mu$g/L. At that dose, a pH of 7.3 is attained naturally. The ferric chloride in this situation is acting as an acid to lower the pH from an initial level of 9.3 down to around 7.3. A superior method of removing arsenic using ferric chloride as a coagulant is to lower the pH of the raw water to around 6.8 prior to the injection of the ferric chloride coagulant to adsorb the arsenic. Presented in FIG. 4 is the dose of ferric chloride that is required if the water pH is lowered by the preferred method to 6.8 with $CO_2$.

Figure 4:
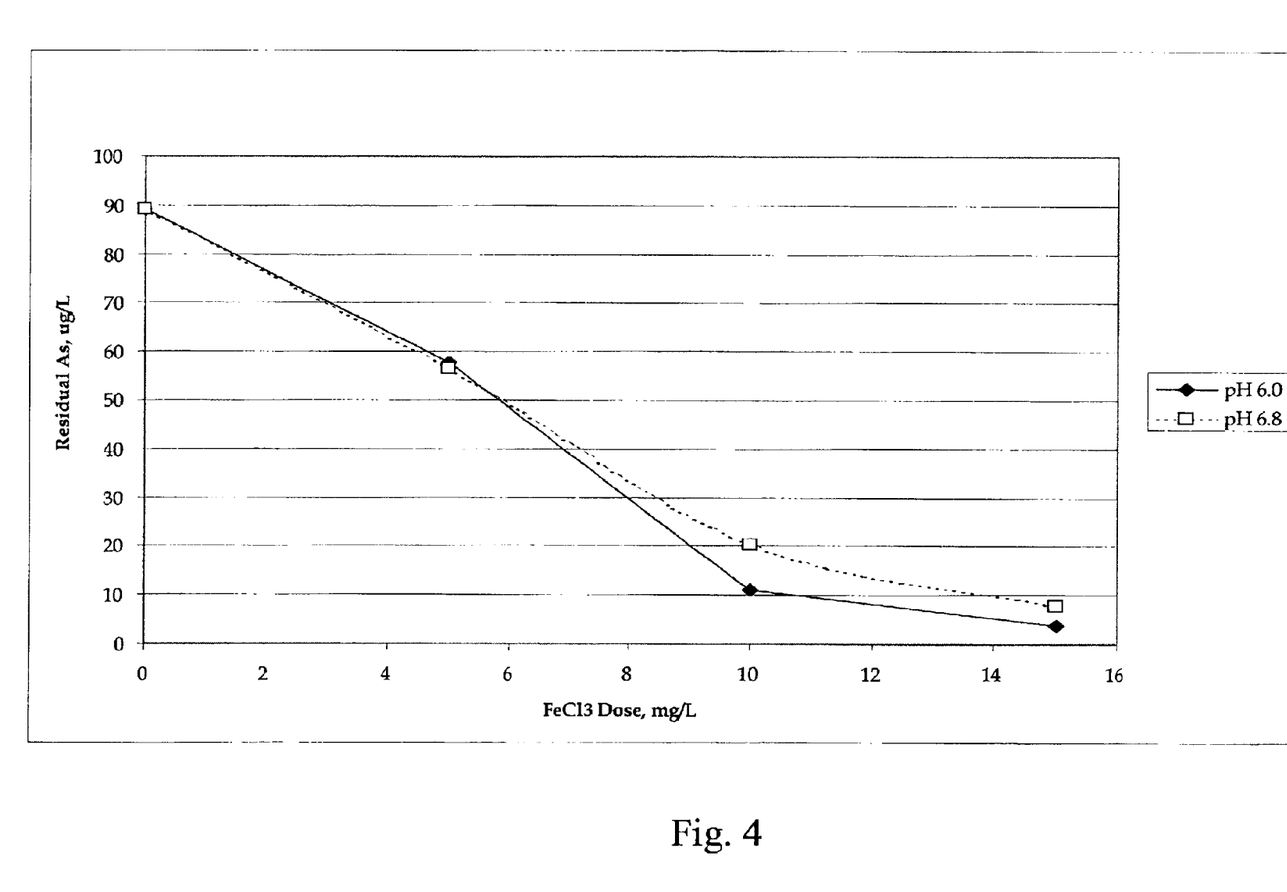
FIG. 4 is a graph showing the ferric chloride dose necessary to achieve desired residual arsenic levels using the coagulation/microfiltration method when pH is reduced with carbon dioxide.

The data in FIG. 4 shows that by lowering the pH to 6.8 by pre-treatment of the water with $CO_2$, the ferric chloride dose can be reduced from 45 mg/L to 15 mg/L with $CO_2$ while still achieving acceptable arsenic removal results. While there is no required lower pH limit, there appeared to be little benefit to lowering the pH to 6.0. Therefore a pH of 6.8 was chosen for pilot testing of the coagulation/microfiltration embodiment of the preferred method. The pilot scale C/MF systems selected for testing were a Pall Microza system and USFilter Memcor microfilter system. The specifics of the microfilter systems are presented in Table 2.

TABLE 2

Microfilter Specifications

| Property | Pall System | Memcor System |
| --- | --- | --- |
| Membrane Type and Material | Hollow Fiber PVDF | Hollow Fiber PVDF |
| Membrane Pore Size | 0.1 micron | 0.2 micron |
| Outside Membrane Area Per Module | 538 ft$^2$ | 322 ft$^2$ |
| Number of Modules | 1 | 3 |
| Recycle | Yes, 10% of Flow | No |

The Pall microfilter has an internal recycle that allows for a percentage of the flow to be recycled from the membrane cartridge back to the feedwater tank. This may help prevent the accumulation of solids within the membrane cartridge and allow for a higher flux rate. The Pall system was initially set up to operate at a flux rate of 42 GFD (gallons per square foot outside area per day). This would require a flow rate of 16 gpm going to the membrane (16 gpm*1440/538 ft$^2$).

The Memcor microfilter was initially operated with a ferric chloride dose of 15 mg/L with a depressed pH of 6.8 by the addition of $CO_2$. The flow rate to each membrane module was set at 6 gpm for a total flow of 18 gpm. This results in a flux rate of around 27 GFD (18 gpm*1440/966 ft$^2$). The backwash frequency was set a 22 minutes.

Figure 5:
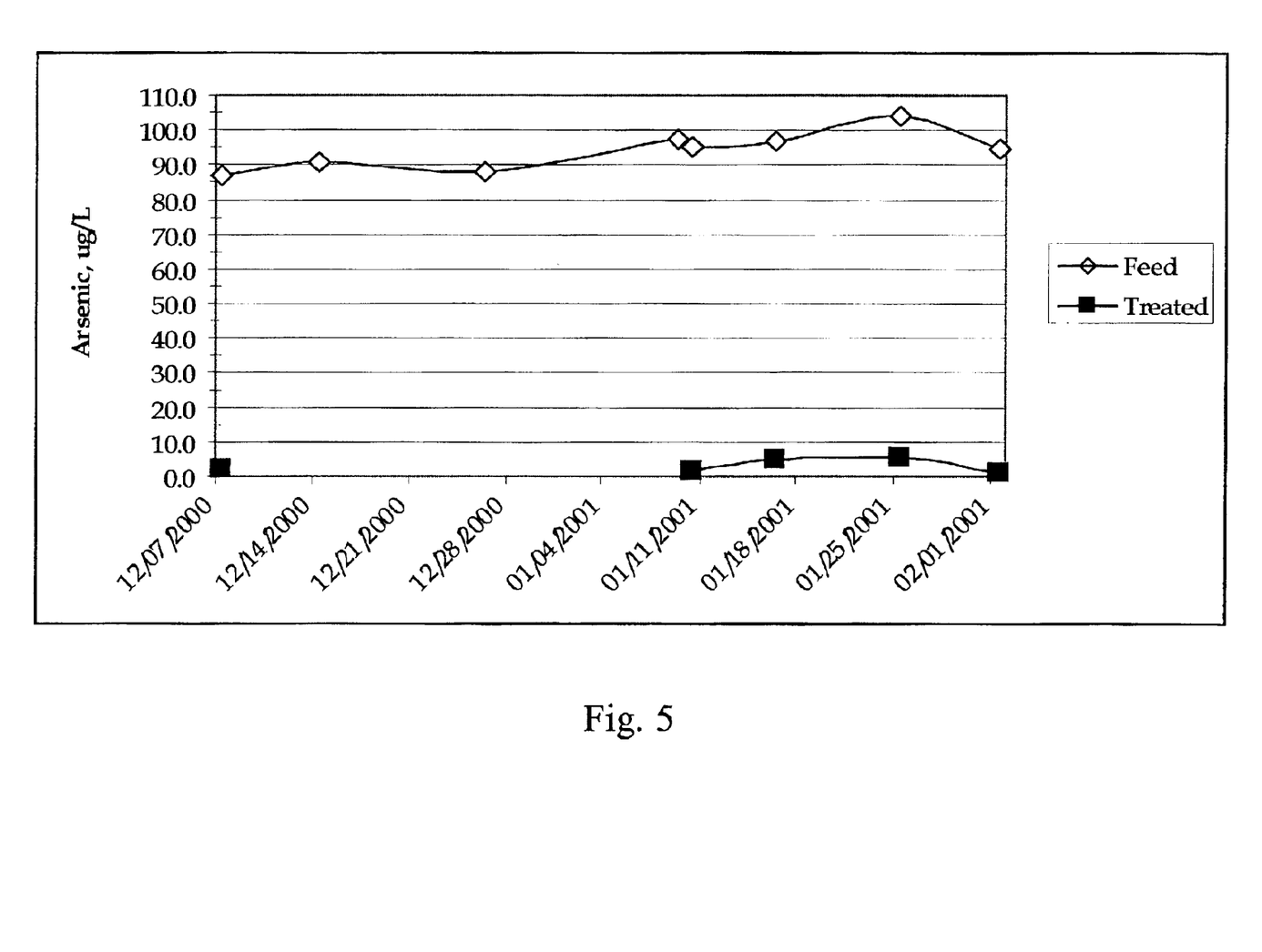
FIG. 5 is a graph showing residual arsenic levels over a two month period when using the coagulation/microfiltration method with reduced pH using carbon dioxide.

The pilot treatment results from the Memcor unit are presented in FIG. 5. As shown in FIG. 5, the Memcor unit was able to consistently produce treated water residual arsenic levels of less than 5 μg/L. The Pall unit has shown similar arsenic removal results.

A key operating parameter of the C/MF process is Solids loading and run time between chemical cleaning. These two parameters are interdependent upon each other. If the solids loading is too high, then time between cleaning will be too short. For most microfilter designs, a chemical cleaning frequency of 30 days is appropriate. Chemical cleaning is done with citric acid to remove any accumulated ferric hydroxide from the membrane cartridge. As such, adding $CO_2$ to lower the pH results in a lower required ferric chloride dose and lower solids loading to the microfilter. As such, the use of $CO_2$ will increase the run time between cleaning.

Both the adsorption column and coagulation/microfiltration embodiments of the preferred method are capable of reducing residual arsenic levels below present Maximum Contaminant Levels (MCL) promulgated by the EPA.

Stripping of $CO_2$ from the depleted water to increase the pH in step 8 is preferably accomplished by aeration of the metal or metalloid depleted water. In certain embodiments, the pH of the metal or metalloid depleted water is initially too low to introduce into a distribution system and would be corrosive to the piping. The pH is increased to a non-corrosive condition by stripping the $CO_2$ out of the water. An exemplary aeration device is a high efficiency aeration device such as that manufactured by Lowry Aeration Systems, Inc. of Bluehill, Me.

Figure 6:
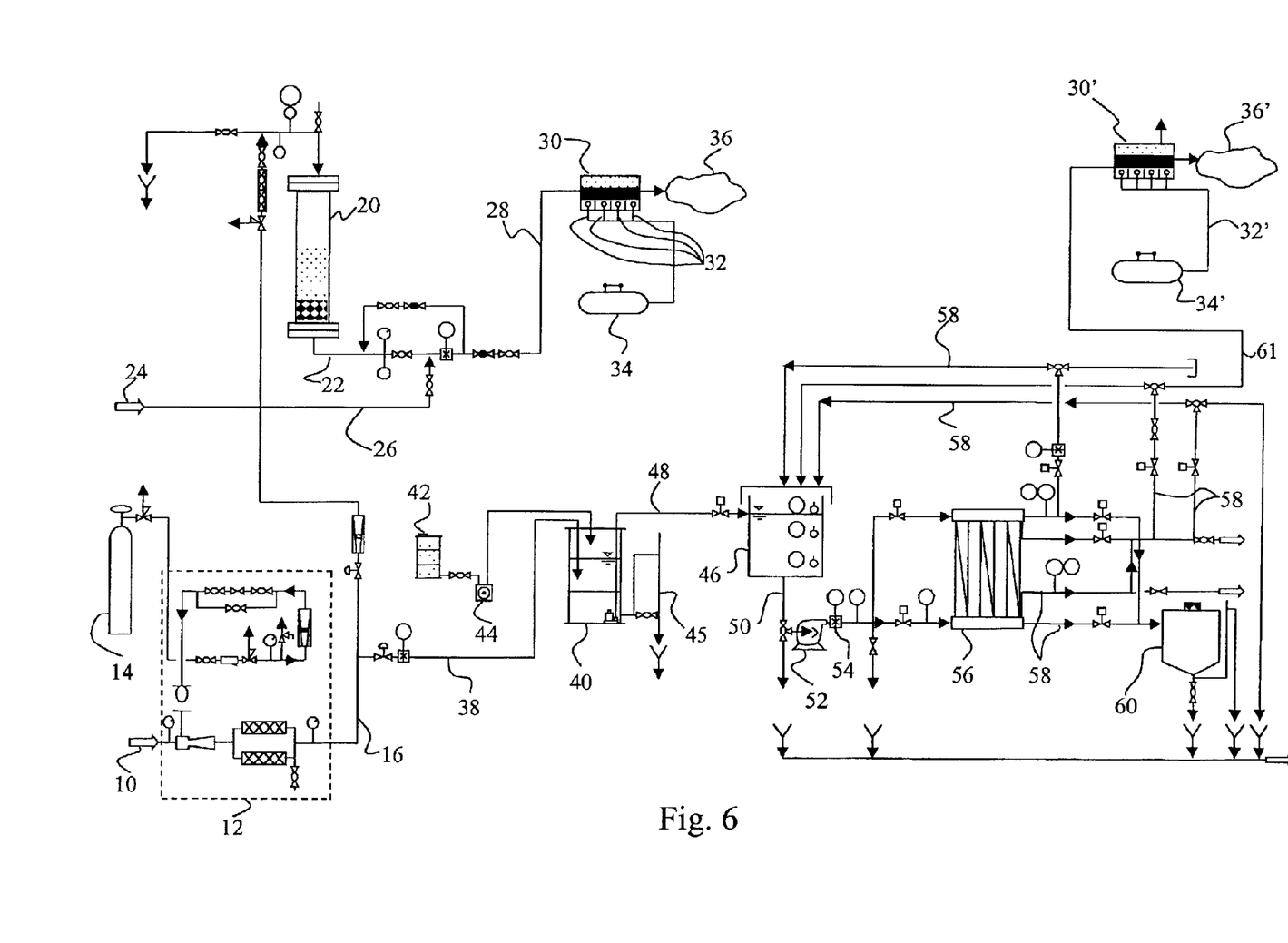
FIG. 6 shows a schematic of one embodiment of the $CO_2$ adsorption media system and coagulation/microfiltration system.

The present invention also provides a novel apparatus for metal or metalloid removal. Many of the details of the system have been described with respect to the method described above. An illustrative embodiment of an arsenic removal apparatus of the invention is shown in FIG. 6. For convenience, FIG. 6 shows two paths for pretreated water. The first path is through an adsorption media for arsenic removal, and the second is a coagulation/microfiltration treatment for arsenic removal. Although the two pathways may be used simultaneously as shown in FIG. 6, in practice, it is likely that only one or the other of the pathways is used. With reference to FIG. 6, a raw water source 10, is delivered into a $CO_2$ feed system 12, which uses a $CO_2$ source 14. The pH of the feed water is reduced to a level suitable for the process chosen. If the adsorption media pathway utilizing granular ferric media is chosen, the pH should be about 6.8. If the coagulation/microfiltration process is utilized with ferric chloride as the coagulant, the pH will be around 7.0. In either case a lower pH is acceptable.

In the adsorption media pathway, a measured flow of $CO_2$-dosed water is routed via conduit 16 to an adsorption media column 20. After arsenic depletion occurs via the adsorption media, the arsenic-depleted water is routed through piping 22. At this point, an additional water source not requiring arsenic removal 24 may be introduced into the system via piping 26. The water is routed through piping 28 for $CO_2$ stripping. $CO_2$ stripping occurs in a tank 30, which is aerated via piping 32 connected to a pressurized air source 34. After $CO_2$ stripping sufficient to raise the pH of the water to an acceptable level, the treated water exits the system through piping 36.

If the coagulation/microfiltration route is used, pretreated water passes from piping 16 to piping 38, into a tank 40. Coagulant is fed from a source 42, via a pump 44 into the tank 40. The tank contains an overflow drain assembly 45. After the water and coagulant are mixed in the tank 40, the solution is routed to break tank 46, through piping 48. Arsenic adsorption-coagulation occurs in the break tank and thereafter, and the solution is removed from the break tank 46 through piping 50. The solution is routed through a pump 52, piping 54, and to the microfiltration membrane 56. After passing through the filter, the arsenic-depleted water is routed through various piping 58, and is conveyed through piping 61 for $CO_2$ stripping. $CO_2$ stripping occurs in a tank 30' which is aerated via piping 32' connected to a pressurized air source 34'. After $CO_2$ stripping sufficient to raise the pH of the water to an acceptable level, the treated water exits the system through piping 36'. The water may be recirculated from the filter 56 to the break tank 46 through piping 58. The filter is also backwashed at various intervals to remove coagulant buildup on the filter. Water from the backwash is routed through piping 58 to a backwash tank 60. The microfiltration system depicted in FIG. 6 is known as the "Continuous Microfiltration" (CMF) Process and is manufactured by U.S. Filter Corporation. Other microfiltration systems known to those skilled in the art are also suitable for use in conjunction with the invention. Alternatively, the solids could be separated by gravity settling, filtration, or any other known way.

FIG. 6 includes various notations providing additional details related to the construction of one embodiment of the $CO_2$ treatment system for metal or metalloid removal. For example numerous valves, pressure gauges, flow elements, and water level controls are shown, but are not described in detail for the sake of simplicity.

What is claimed is:

1. A method of removing a metal or a metalloid from water comprising:
   providing water containing a metal or a metalloid from a source;
   contacting the water with carbon dioxide whereby the pH of the water is lowered producing pre-treated water;
   contacting the pre-treated water with a metal or metalloid complex-adsorbing substance to produce a metal or metalloid depleted water; and
   stripping the carbon dioxide from the depleted water whereby the pH of the depleted water is increased.

2. The method of claim 1 wherein the metal or metalloid is selected from the group consisting of arsenic, copper, antimony, selenium, mercury, cadmium, chromium and lead.

3. The method of claim 1 wherein the pH is lowered to about 7.0 or less to produce the pre-treated water.

4. The method of claim 1 wherein the metal or metalloid complex-adsorbing substance is an adsorption media.

5. The method of claim 1 wherein the metal or metalloid complex-adsorbing substance is a coagulant.

6. The method of claim 5 further comprising filtering the depleted water to separate the coagulant and bound metal or metalloid from the depleted water.

7. The method of claim 1 wherein the carbon dioxide is stripped from the depleted water by aeration.

8. A method of removing arsenic from water comprising:
   providing water containing arsenic from a source; contacting the water with carbon dioxide whereby the pH of the water is lowered to about 7 or less producing pre-treated water; and
   contacting the pre-treated water with an arsenic complex-adsorbing substance to produce arsenic depleted water.

9. The method of claim 8 wherein the pre-treated water is contacted with the arsenic complex-adsorbing substance for a time sufficient to produce an arsenic depleted water having less than 10 μg/L arsenic.

10. The method of claim 8 further comprising stripping the carbon dioxide from the arsenic depleted water whereby the pH of the arsenic depleted water is increased.

11. The method of claim 10 wherein the carbon dioxide is stripped from the arsenic depleted water by aeration.

12. The method of claim 8 wherein the arsenic complex-adsorbing substance is an adsorption media.

13. An apparatus for removing arsenic from water containing arsenic comprising:
   a water flow from a source of water containing arsenic;
   a source of carbon dioxide in fluid communication with the water flow supplying carbon dioxide to the water flow to lower the pH of the water to about 7 or less producing a pre-treated water flow; and
   a contact chamber containing an arsenic complex-adsorbing substance in fluid communication with the pre-treated water flow to remove arsenic from the pre-treated water flow producing an arsenic depleted water flow.

14. The apparatus of claim 13, wherein the contact chamber is an adsorption chamber containing a complex-adsorbing medium.

15. The method of claim 8 wherein the arsenic complex adsorbing substance is metal based.

16. The apparatus of claim 13 wherein the arsenic complex-adsorbing substance is metal based.

17. A method of removing arsenic from water comprising:
   providing water containing arsenic from a source;
   contacting the water with carbon dioxide whereby the pH of the water is lowered producing pre-treated water; and
   contacting the pre-treated water with an arsenic complex-adsorbing coagulant to produce an arsenic depleted water.

18. The method of claim 17 further comprising filtering the arsenic depleted water to separate the coagulant and bound arsenic from the arsenic depleted water.

19. The method of claim 17 where in the arsenic complex-adsorbing coagulant is metal based.

20. The method of claim 17 wherein the pre-treated water is contacted with the arsenic complex-adsorbing substance for a time sufficient to produce an arsenic depleted water having less than 10 μg/L of arsenic.

21. The method of claim 17 further comprising stripping the carbon dioxide from the arsenic depleted water whereby the pH of the arsenic depleted water is increased.

22. A method of removing arsenic from water comprising:
   providing water containing arsenic from a source;
   contacting the water with carbon dioxide whereby the pH of the water is lowered producing pre-treated water; and
   contacting the pre-treated water with a metal based arsenic complex-adsorbing substance to produce arsenic depleted water.

23. The method of claim 22 wherein the pre-treated water is contacted with the arsenic complex-adsorbing substance for a time sufficient to produce an arsenic depleted water having less than 10 μg/L of arsenic.

24. The method of claim 22 further comprising stripping the carbon dioxide from the arsenic depleted water whereby the pH of the arsenic depleted water is increased.

25. The method of claim 22 wherein the arsenic complex-adsorbing substance is an adsorption media.

26. An apparatus for removing arsenic from water containing the arsenic comprising:
   a water flow from a source of water containing arsenic;
   a source of carbon dioxide in fluid communication with the water flow supplying carbon dioxide to the water flow to lower the pH of the water producing a pre-treated water flow; and
   a mixing tank in fluid communication with the pre-treated water flow and a coagulant supply system supplying arsenic complex-adsorbing coagulant to the pre-treated water flow to remove arsenic from the pre-treated water flow producing an arsenic depleted water flow.

27. The apparatus of claim 26 further comprising a filter in fluid communication with the arsenic depleted water flow producing a filtered water flow.

28. The apparatus of claim 26 further comprising a carbon dioxide stripping apparatus in fluid communication with the depleted water flow for stripping the carbon dioxide from the arsenic depleted water.

29. The apparatus of claim 26 wherein the arsenic complex-adsorbing coagulant is metal based.

30. An apparatus for removing arsenic from water containing arsenic comprising:
   a water flow from a source of water containing arsenic;
   a source of carbon dioxide in fluid communication with the water flow supplying carbon dioxide to the water flow to lower the pH of the water producing a pre-treated water flow; and
   a contact chamber containing a metal based arsenic complex-adsorbing substance in fluid communication with the pre-treated water flow to remove arsenic from the pre-treated water flow producing an arsenic depleted water flow.

31. The apparatus of claim 30 further comprising a carbon dioxide stripping apparatus in fluid communication with the arsenic depleted water flow for stripping the carbon dioxide from the arsenic depleted water.

32. The apparatus of claim 30 wherein the contact chamber is an adsorption chamber containing a complex-adsorbing medium.

33. An apparatus for removing a metal or a metalloid from water containing the metal or metalloid comprising:
   a water flow from a source of water containing a metal or a metalloid;
   a source of carbon dioxide in fluid communication with the water flow supplying carbon dioxide to the water flow to lower the pH of the water producing a pre-treated water flow;
   a contact chamber containing a metal or metalloid complex-adsorbing substance in fluid communication with the pre-treated water flow to remove the metal or the metalloid from the pre-treated water flow producing a metal or metalloid depleted water flow; and
   a carbon dioxide stripping apparatus in fluid communication with the metal or metalloid depleted water flow for stripping the carbon dioxide from the depleted water.

34. The apparatus of claim 33 wherein the metal or metalloid is selected from the group consisting of arsenic, copper, antimony, selenium, mercury, cadmium, chromium, and lead.

* * * * *